T. Holmes.
Dough Mixer.
N°. 95,021. Patented Sep. 21, 1869.
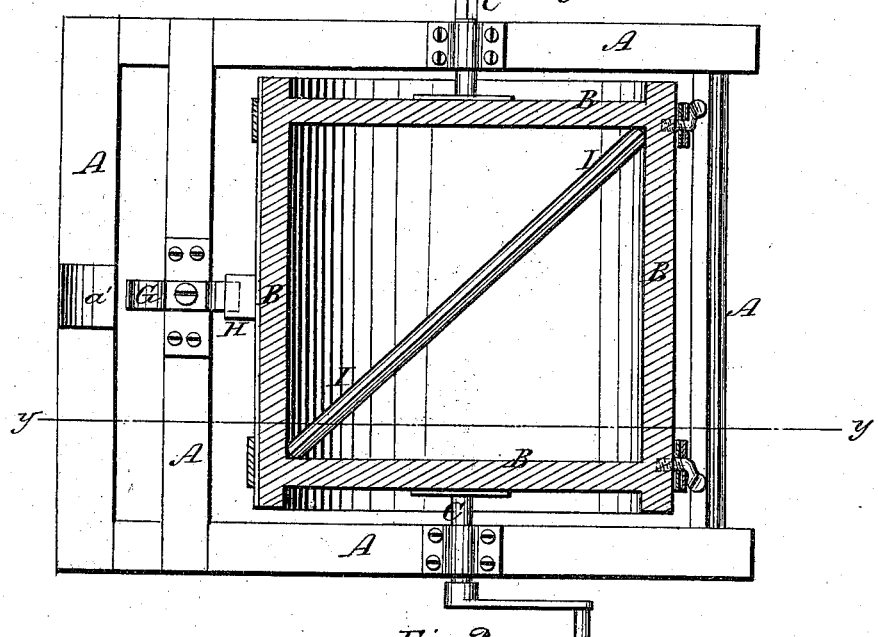
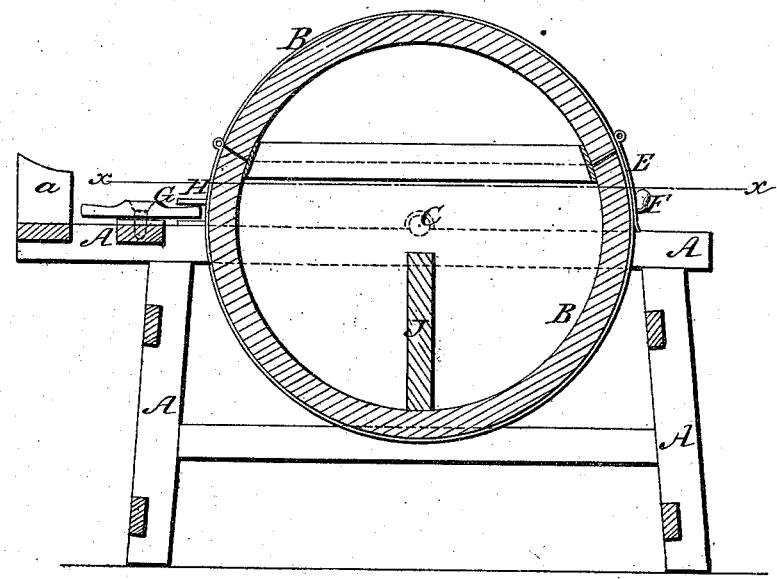
Witnesses.
A. W. Almquist
Geo. W. Mabee
Inventor
Thos. Holmes
per Munn & Co.
Attys

United States Patent Office.

THOMAS HOLMES, OF WILLIAMSBURG, NEW YORK.

Letters Patent No. 95,021, dated September 21, 1869.

IMPROVED REVOLVING DOUGH-MIXER.

The Schedule referred to in these Letters Patent and making part of the same

---

*To all whom it may concern:*

Be it known that I, THOMAS HOLMES, of Williamsburg, in the county of Kings, and State of New York, have invented a new and useful Improvement in Revolving Dough-Mixers; and I do hereby declare that the following is a full, clear, and exact description thereof, which will enable others skilled in the art to make and use the same, reference being had to the accompanying drawings, forming part of this specification, in which—

Figure 1 is a horizontal section of my improved dough-mixer, taken through the line $x\ x$, fig. 2.

Figure 2 is a vertical section of the same, taken through the line $y\ y$, fig. 1.

Similar letters of reference indicate corresponding parts.

My invention has for its object to improve the construction of my improved dough-mixer, patented June 15, 1869, and numbered 91,335, so as to make it simpler and less expensive in construction, while doing its work equally well; and It consists in the construction and combination of various parts of the mixer, as hereinafter more fully described.

A is the frame of the machine, which is made of a convenient height, and of a length and breadth proportional to the desired capacity of the machine.

B is a cylindrical vessel, which may be made larger or smaller, according to the amount of flour required to be wet or mixed at a time. A vessel about three feet long, and three feet in diameter, will wet or mix about a barrel of flour at a time.

To the ends of the vessel B are attached journals, C, which revolve in bearings attached to the frame A, and to the projecting end of one or both of which journals is attached a crank or pulley, by means of which power may be applied to revolve the cylinder B. One or both the journals C may be provided with a fly-wheel, and the machine may be operated by hand, steam, or other power, as may be convenient.

The vessel B is divided longitudinally into two unequal parts, which parts are hinged to each other at one edge, and secured to each other at the other edge when closed by the hasps E and buttons F.

The vessel B is held securely in position, and prevented from turning while the flour is being put into or the dough removed from it, by the button G, one or more of which should be used, according to the size of the machine.

The buttons G are pivoted to the frame A, and button into catches or open keepers, H, attached to the larger part of the vessel, near its upper edge.

$a'$ is a short post, one or more of which may be used, attached to the rear part of the frame A, upon the upper end of which the smaller or hinged part of the vessel B rests when turned back or opened.

I is a rod, bar, or knife, which may be round, oval, or flattened, and which is made of such a length as to extend diagonally across the centre of the vessel B, with its ends resting in the angles between the ends and sides of said vessel.

When the mixer is not required for immediate use for mixing another batch, the mixed dough may be allowed to stand and become light in the vessel B. But when the mixer is again required for immediate use, the mixed dough may be removed and allowed to rise in an ordinary mixing-trough, or other suitable receptacle.

In using the mixer, the desired amount of flour and water are placed in the cylindrical vessel B, which is then securely closed, and slowly revolved until its contents are thoroughly mixed.

J is an adjustable partition, placed longitudinally in the vessel B, and supported, when adjusted, by bars, blocks, flour, or other convenient supports, placed between it and the side of the vessel B. This partition is designed to keep the dough confined in a compact mass when left to rise in the vessel B.

It will be observed that the bar or knife I can change its position freely while the machine is being used; that is to say, its ends are free to move around the circle of the ends of the cylinder B, but it can never get into any other position than passing diagonally across the said cylinder B.

Having thus described my invention,

I claim as new, and desire to secure by Letters Patent—

1. The loose diagonal bar or knife I, in combination with the revolving cylindrical vessel B, substantially as herein shown and described, and for the purpose set forth.

2. The combination of the buttons G (one or more) and catches or open keepers H with the frame A and revolving cylindrical vessel B, provided with the adjustable partition J and bar I, all constructed and arranged as herein shown and described, and for the purpose set forth.

The above specification of my invention signed by me, this 23d day of June, 1869.

THOS. HOLMES.

Witnesses:
FRANK BLOCKLEY,
JAMES T. GRAHAM.